United States Patent [19]

Huber et al.

[11] Patent Number: 4,936,039

[45] Date of Patent: Jun. 26, 1990

[54] FISHING ROD HOLDER AND METHOD OF USING SAME

[76] Inventors: Stuart Huber, R.R. 4; Leland Fruhling, 3022 Avenue I, both of, Kearney, Nebr. 68847

[21] Appl. No.: 428,924

[22] Filed: Oct. 30, 1989

[51] Int. Cl.⁵ .............................................. A01K 97/10
[52] U.S. Cl. ....................................................... 43/21.2
[58] Field of Search ................ 43/21.2; 248/520, 525, 248/528, 529, 530, 533, 534

[56] References Cited

U.S. PATENT DOCUMENTS

| | | | |
|---|---|---|---|
| 3,543,432 | 12/1970 | Gates | 43/21.2 |
| 3,956,846 | 5/1976 | Kent | 43/21.2 |
| 4,581,838 | 4/1986 | Moon | 43/21.2 |
| 4,748,762 | 6/1988 | Campbell | 43/21.2 |

FOREIGN PATENT DOCUMENTS 15991 of 1893 United Kingdom ................ 248/533

*Primary Examiner*—M. Jordan
*Attorney, Agent, or Firm*—Bernard L. Kleinke; William Patrick Waters; Jerry R. Potts

[57] ABSTRACT

The new fishing rod holder and the method of using it, relate to the use of the holder having a stake for insertion into the ground, and a fishing pole holding member, which is swingably connected to the stake and which can be swung to a storage position adjacent to the stake. The fishing rod holding member has a rod receiving portion including a strength imparting neck and a curved lip which cooperate in supporting a fishing rod handle of various different sizes and shapes in a secure manner without any need of adjustment of the rod holding member.

9 Claims, 1 Drawing Sheet

U.S. Patent
Jun. 26, 1990
4,936,039
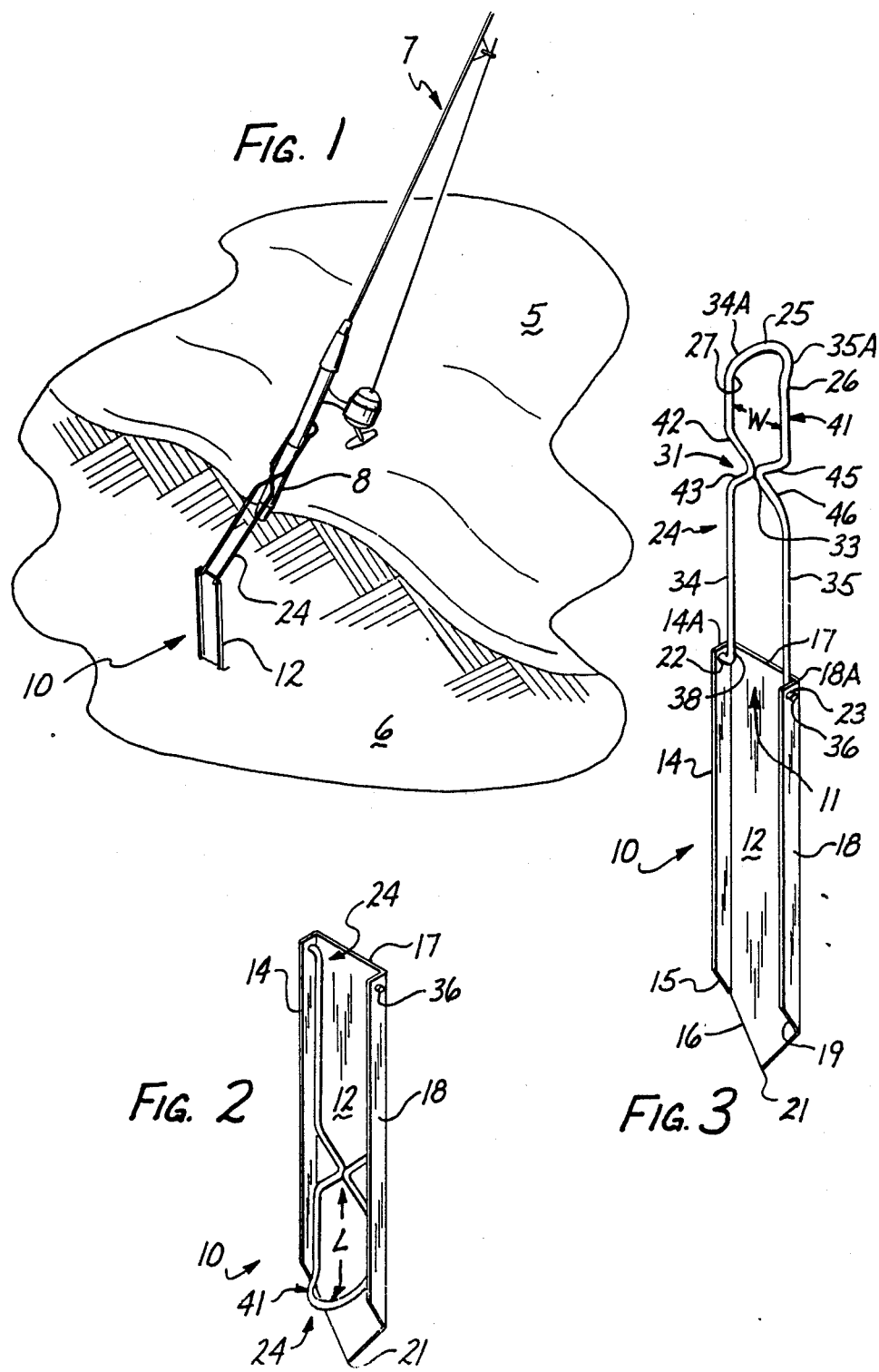

FISHING ROD HOLDER AND METHOD OF USING SAME

TECHNICAL FIELD

The present invention relates, in general, to a fishing rod holder and a method of using it, for supporting a fishing rod in an upright use position, from the ground, such as at a shoreline.

BACKGROUND ART

Fishing rod holders are utilized in both recreational and commercial settings to enable the user to have one or more fishing rods in use at any given time, without the necessity of physically holding the rod, while waiting for a fish to strike. Fishing rod holders are generally utilized on the shorelines of streams and rivers, or on sandy beaches. The holder is driven into the ground to a sufficient depth so that the holder will have sufficient purchase to enable it to support and to hold a weighty fishing pole in a secure manner, in an upright manner from the ground.

The necessity for holding securely the fishing rod in a secure manner is especially important when a large fish strikes the hook and takes the bait. In such a circumstance, the fishing rod can become dislodged inadvertently from the fishing rod holder, or the holder can be pulled out of the ground, such as a sandy bank, inadvertently by the force of the fish pulling on the fishing line.

For these reasons, typical conventional holders have utilized a single pointed wire prong for insertion into the ground. In this regard, reference may be made to U.S. Pat. Nos. 1,275,928; 2,512,151; 2,971,735 and 3,411,231.

The prong does not provide, for some applications, an adequate amount of firm support for the fishing rod during use. In this regard, the prong tends to be dislodged from the ground by a force applied to the fishing rod by a fish, or by the weight of the rod. Also, the flimsy wire prong can be bent or dislodged under the weight of the fishing rod itself. Due to the fact that the foregoing patents disclose wire prongs for anchoring the holder to the ground, such devices tend to slip out of the ground, when force is applied to them by the rod, and such force may be sufficient to pry the smooth wire prong out of the ground. This problem is compounded when a large, vigorous fish pulls on the fishing line.

In an attempt to overcome the deficiencies of the single wire prong support, a pair of pointed wire prongs have been employed. In this regard, reference may be made to U.S. Pat. Nos. 2,137,645 and 3,956,846. However, the aforementioned deficiencies of a single pointed wire, are not adequately overcome by utilizing two such wires. This is due, in some cases, to the fact that dual prongs do not provide appreciably greater purchase than a single wire prong and, generally, do not avoid the problems of inadvertent dislodgement, and/or bending or breaking of the wires.

Thus, in view of the deficiencies in conventional holders, it would be advantageous to have a fishing rod holder for holding securely a fishing rod in an upright manner from the ground. Such a support should be capable of being firmly anchored to the ground, either soil or sand.

U.S. Pat. No. 4,581,838 avoids the deficiencies of support prongs by providing a stake member for insertion into the ground. However, the fishing rod holder disclosed in the U.S. Pat. No. 4,581,838 requires an additional support member to hold the fishing rod holder in place. In addition, it requires the fishing rod to be engaged by two different portions of the holder. In this regard, it is awkward to remove the fishing rod from the holder during use. Since the top edge of the stake is configured to engage a portion of the fishing rod, it is difficult to drive the stake into hard ground, because the top edge can not be readily hit with a tool, such as a hammer.

Thus, it would be very desirable to have a fishing rod holder which can be firmly anchored in the ground, and which can be conveniently driven into the ground, by a tool, such as a hammer.

Also, such a holder should be capable of supporting the rod in such a manner that it can be quickly and easily attached to the holder.

In this regard, when a fish takes the bait and pulls on the fishing line, the user should be able to remove the rod from the holder in a fast and convenient manner, so that the fishing rod can be manipulated to retrieve the fish. If awkward manipulations are required to free the rod from the holder, the fish could escape inadvertently.

Even though the rod should be easily removable, it must be retained securely in place on the holder to insure that a fish pulling on the line does not dislodge the rod from the holder. Additionally, such a new and improved holder should be simple in design, and relatively inexpensive to manufacture.

Because of user preferences and, sometimes, the type of fishing involved, fishing rods vary significantly in their characteristics such as length, diameter and weight. For example, the handle ends or handles of conventional fishing rods may have a diameter ranging from ¾ inch to approximately an inch and a quarter. In this regard, while prior known supports utilizing bent wire or sleeve-type rod holders, may be suitable for some applications, such supports have limited utility because of a lack of adaptability for supporting rods having different sizes and shapes. Further, while such limited utility might be realized for straight handle fishing rods, conventional rod holders are frequently not adapted to support pistol grip rods. Thus, it would be highly advantageous to provide a fishing rod holder which is capable of supporting rods having different sizes and shapes in a secure manner, including rods having pistol grips, especially if such a holder is provided without any necessity for adjustment. Also, such a new and improved holder should be able to position the rod in a number of different orientations to permit a reel on the rod to be positioned in a freely operative manner.

Another consideration with regard to fishing rod holders during the fishing operation, it is oftentimes desirable to maintain the fishing rod at an angle to the horizontal of approximately 45 degrees. Such an angle permits clearance of the fishing line over objects such as boulders or tree limbs, between the user and the water. In addition, the angle provides for the maintenance of a desired tension on the fishing line.

Conventional fishing rod supports frequently lack the structural strength to maintain the fishing rod at such a desired angle. Moreover, prior known holders frequently require an adjusting mechanism to lock the support at a predetermined angle. Such an angle adjusting mechanism can slip or otherwise malfunction during use, thereby decreasing the chances of the user in successfully catching a fish. In this regard, it would be very desirable to provide a fishing rod support which would position the rod at a desired angle in a secure manner, without any need for adjustment of the support.

Other considerations with regard to fishing rod holders relate to their storage when not in use, and to their ability to be transported to and from the fishing site. It is clear that a fishing rod support having a sharp-pointed prong or stake of substantial length for anchoring a fishing rod holder securely in the ground, can be dangerous when not in use. The length of the prong or stake, however, would present difficulties during storage and transportation of the support. Thus, for safety and convenience, it would be very desirable to have a fishing rod holder capable of anchoring a fishing rod securely in the ground during use, and yet be readily transported or stored, when not in use.

DISCLOSURE OF INVENTION

It is the principal object of this invention to provide a new and improved fishing rod holder and a method of using it, to support a fishing rod in an upright position from the ground, and yet be readily freed from the holder in a fast and convenient manner, when a fish pulls on the fishing line.

Another object of the present invention is to provide such a new and improved holder, which is easy to install and has provisions for various different sizes and shapes of fishing rods, including rods with pistol grips, and which holds the rod at a desired angle without need for adjustment mechanisms.

Another object of the present invention is to provide such a fishing rod holder which can be readily stored and transported, and which is relatively inexpensive to manufacture, light in weight and constructed of corrosion resistant materials.

Briefly, the above and further objects of the present invention are realized by providing a fishing rod holder and a method of using it to support a fishing rod from the ground in a secure manner, and yet permitting the user to remove the rod therefrom in a fast and convenient manner.

The new fishing rod holder, and the method of using it, relate to the use of the holder having a stake for insertion into the ground, and a fishing pole holding member, which is swingably connected to the stake and which can be swung to a storage position adjacent to the stake. The fishing rod holding member has a rod receiving portion including a strength imparting neck and a curved lip which cooperate in supporting a fishing rod handle of various different sizes and shapes in a secure manner without any need of adjustment of the rod holding member.

In use, the stake is driven into the ground, and the rod handle holding element is swung into an angular position relative to the stake for supporting securely the butt or handle of a fishing rod at an angle to the ground. The fishing rod holding element extends up and away from the plane of the vertical stake at an angle of approximately 45 degrees from the vertical.

The fishing rod handle is merely slipped into the holding member between the lip and the neck and is cocked in that position. Thus, it can withstand violent tugging on the fishing line, without becoming dislodged from the holder. However, the inventive holder is so constructed that the user can merely lift the rod handle directly up out of the holder, without any awkward manipulations. Separation of the rod from the hold is accomplished in one simple, fast movement, by merely picking up the rod handle by the hand of the user. Thus, a fish pulling on the line can be quickly retrieved.

Additionally, the reel on the fishing rod can be oriented in any direction, since it is not relied upon to help support the rod on the holder. Also, the rod is held at a desired angle to the ground.

The inventive holder is thus far superior to all prior known fishing rod holders, in its function and operation, and yet it is constructed essentially of only two components. Thus, it is relatively inexpensive to manufacture, and it can withstand rugged outdoor use without malfunctioning.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is a pictorial view of a fishing rod holder, which is constructed according to the present invention, and which illustrated supporting a fishing rod;

FIG. 2 is an enlarged elevational view of the holder of FIG. 1, showing it in a storage or closed position; and FIG. 3 is an elevational view of the holder of FIG. 1, showing it in a partially opened position.

BEST MODE FOR CARRYING OUT THE INVENTION

Referring now to the drawings, and more particularly to FIG. 1 thereof, there is shown a new fishing pole holder 10 which is constructed in accordance with the present invention. The holder 10 supports a conventional fishing rod 7 in an upright, inclined manner, and is anchored to the ground such as a shoreline 6, adjacent to a body of water 5.

As best seen in FIGS. 2 and 3, the fishing rod holder 10 generally comprises a pointed stake 12 adapted to be driven into the ground, and an elongated rod support member 24 swingably attached near the top edge of the stake for receiving and supporting a butt portion or handle 8 of the rod 7.

In operation, the support member 24 is swung away from its storage position, into its use position as shown in FIG. 1, and the stake is driven into the ground 6. The handle portion 8 of the fishing pole 7 is inserted downwardly into an opened rod receiving portion 41 of the support member 24 and remains cocked at an angle to be held securely therewithin.

Considering now the stake 12 in greater detail with reference to FIG. 3, the stake 12 is channel shaped and includes a back wall 16 and a pair of oppositely disposed, parallel side flanges 14 and 18 which are integrally connected at right angles to the back wall 16. A top edge 17, together with top edges 14A and 18A, of side flanges 14 and 18, respectively, provide a smooth, flat surface adapted to be struck by a conventional tool, such as a hammer (not shown) to drive the stake into the ground. The top edges form a bight 11 for support of the rod support member 24. Opposite the top edge 17, the wall 16 includes a pointed bottom end 21. The flanges 14 and 18 terminate at angled or tapered bottom edges 15 and 19, respectively, to facilitate, in cooperation with the point 21, insertion of the stake 12 into the ground 6. After insertion of the stake 12 into the ground, the flanges 14 and 18 cooperate with the back wall 16 to hold the stake 12 firmly in place and to resist forces tending to rotate it.

At the top ends of the flanges 14 and 18, a pair of oppositely disposed apertures 22 and 23 receive outturned respective end portions 38 and 36 of the holding member 24 for journalling the end portions 38 and 36 for rotation about an axis of rotation extending between the apertures 22 and 23. Thus, the member 24 swings about the axis of rotation through an angle of about 22 degrees, between the storage position of FIG. 2, and the use position of FIG. 1. In the use position, the member 24 is inclined backwardly at the angle of approximately 225 degrees from its storage position parallel to the stake, and engages the top edge 17 thereof as a stop.

The stake 12 may be of suitable hardened plastic material or metal material, such as steel. Its outside width may range from approximately one inch to approximately two inches, with a preferred width of approximately one and one quarter inches. The outside height of the flanges 14 and 18 may range from approximately one half inch to approximately one inch, with a preferred height of approximately five eighths inch.

The rod holding member 24 is formed of a single piece of heavy wire or rod stock bent into the desired configuration as shown in the drawings. The member 24 includes a pair of substantially parallel, elongated portions or legs 34 and 35 terminating at their bottom in the out turned ends 36 and 38 and at their top ends in a rod receiving portion 41.

As depicted in FIG. 1, when the stake 12 is inserted vertically into the ground 6 to a desired depth, the holding member 24 may be swung upwardly away from the stake 12 to the fishing rod holding position. The rod holding member 24 attains an angle in relation to the vertical of approximately 45 degrees. This angle cannot be increased by virtue of the fact that the top edge 17 of the bight 11 limits further movement of the rod holding member 24 beyond the angle of approximately 45 degrees from the vertical (an angle of about 225 degrees from its storage position of FIG. 2).

Considering now the holding member 24 in greater detail, the rod receiving portion 41 includes a curved lip portion 25 for receiving and engaging supportingly the underside of the rod handle 8.

The rod receiving portion 41 includes an inwardly bent or pinched neck 31 for receiving and engaging supportingly the upper side of the handle 8. Thus, as shown in FIG. 1, the handle 8 is held firmly but releasable within the rod receiving portion 41, by being cocked therewithin.

The length L and the width W of the rod receiving portion 41 are sufficiently large to receive fishing rod handles of varying lengths and diameters, including pistol grips, for easy insertion into, and removal therefrom.

The neck 31 is formed of two pairs of smaller legs 42, 43, 45 and 46. The first pair of legs 42 and 43 form a V shape and abuts at its apex, the apex formed by the V shaped second pair of legs 45 and 46. The two pairs of legs engage one another at 33 for rigidifying the member 24 to help support the fishing rod handle 8 in a secure manner.

The dimension L may range from approximately 1 ½ inches to approximately 2 inches with a preferred length of approximately 2 inches. The dimension W may range from approximately one inch to approximately two inches with a preferred length of approximately one inch.

Considering now the lip 25 in greater detail, it is generally U-shaped, and includes arcuate extension portions 34A and 35A which extend from the legs 34 and 35, respectively inclined at an angle of approximately 45 degrees away from a plane normal to the plane formed by the legs 34 and 35. The inclined curved lip 25 is adapted for receiving snugly the handle 8 of the fishing pole 7 and conform generally to its shape. The lip 25 functions as a fulcrum so that the weight of the fishing pole and tension on the fishing line combine to urge the handle 8 against the neck 31, thereby holding the handle 8 securely in place. The rod 7 can be easily removed from the rod holder 10 by lifting the handle 8 out of contact with the lip 25 toward the vertical, and then lifting it manually upwardly out of the portion 41 of the holder 10.

Considering now the curved lip 25 in still greater detail, the lip is formed by a smoothly curved portion 34A which extends from the leg 34 at an angle 27 of approximately 45 degrees, and joins a similar curved portion 35A which smoothly joins the leg 35 at a similar (45 degree) angle 26. In this manner, the lip 25 is formed so that it functions as a cradle to hold securely fishing pole handles, such as the handle 8, of varying diameters and shapes without any necessity for adjustment.

The pole holding member 24 may be composed of metal wire or rod stock and the metal material may be a suitable chromed steel.

For storage, the holding element 24 swings into a position parallel to the channel shaped stake 12, so that the legs 34 and 35 fit snugly against the side flanges 14 and 18 respectively. Thus, a generally flat, compact configuration is provided for convenient storage or transportation purposes.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A fishing rod holder comprising:
   a stake having a pointed bottom end; and
   a pole holding member swingably connected to said stake, said member having a pair of substantially parallel, elongated legs, a rod receiving portion having a first support for a first part of a fishing rod and a neck for supporting a second part of a fishing rod disposed in an inclined cocked manner.

2. A fishing rod holder of claim 1, wherein said stake is channel shaped.

3. A fishing rod holder of claim 1, wherein said stake includes a flat surface and a pair of laterally spaced flanges attached to said surface, each of said flanges having an aperture located near the top of said stake.

4. A fishing rod holder of claim 1, wherein said pole holding member includes a pair of out turned end portions for insertion into said apertures for journalling said end portions for rotation about an axis of rotation extending between said apertures.

5. A fishing pole holder of claim 1, wherein said first support is an inclined arcuate lip joining the distal ends of said legs.

6. A fishing pole holder of claim 1, wherein said neck includes a pair of abutting V-shaped portions of said legs.

7. A fishing pole holder of claim 1, wherein said pole holding member is swingable into a closed position in engagement with said stake.

8. A fishing pole holder of claim 1, wherein said rails have tapered edges to facilitate insertion of said stake into the ground.

9. A method of supporting a fishing pole comprising:
using a channel shaped stake having a pole holding member swingably connected thereto;
swinging said member away from said stake;
inserting said stake to a desired depth in the ground; and
inserting the fishing pole into said member to provide support for said pole by said member.

* * * * *